May 31, 1927.
S. OPDYKE
SELF SEALING TRAP
Filed Aug. 28, 1924
1,630,861
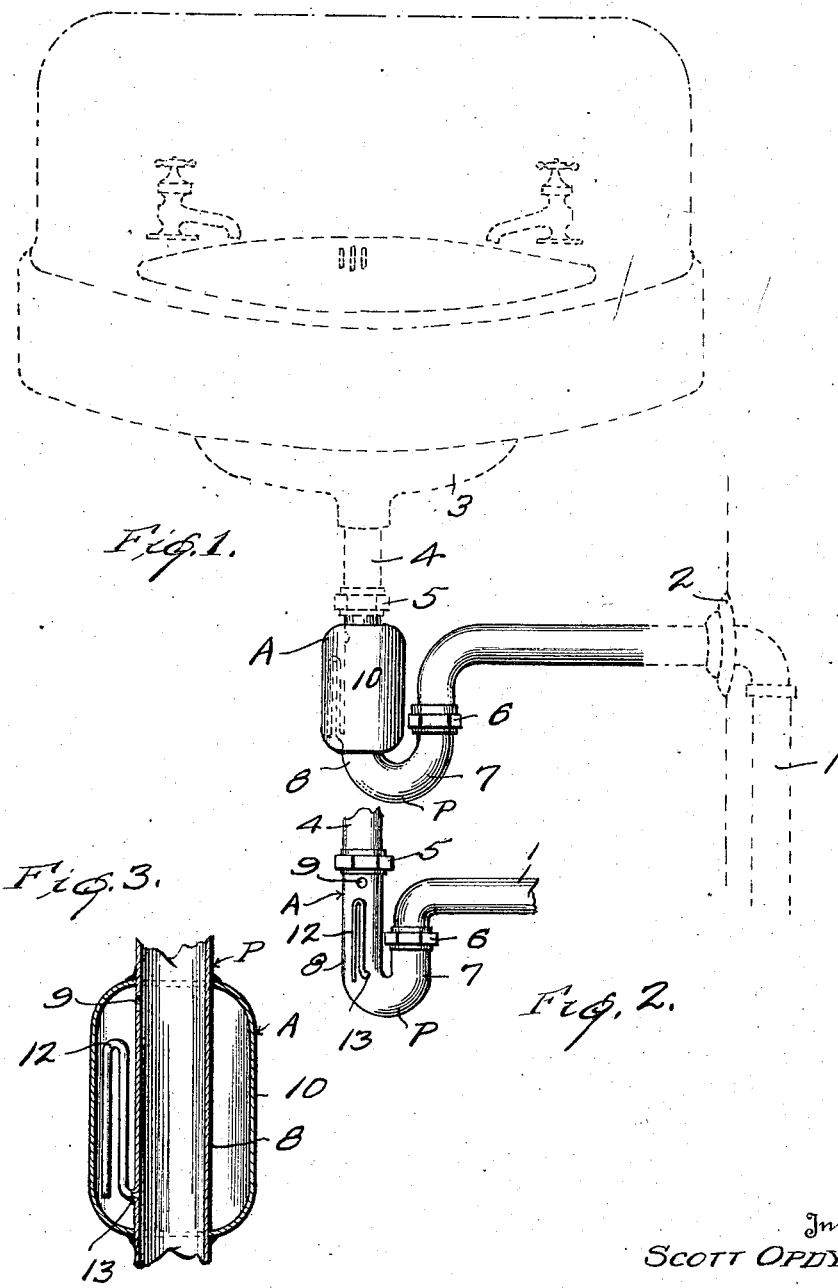
Inventor
SCOTT OPDYKE Patented May 31, 1927.

1,630,861

UNITED STATES PATENT OFFICE.

SCOTT OPDYKE, OF BILLINGS, MONTANA.

SELF-SEALING TRAP.

Application filed August 28, 1924. Serial No. 734,801.

This invention relates to an automatic self sealing trap and has for its prime object to provide means for automatically filling the sealing trap associated with the usual waste pipe leading from a fixture such as a wash basin or the like should the same become empty.

A further object of the invention is to provide an apparatus of this nature which may be readily installed as is the ordinary trap and one which will be reliable in operation, simple in construction, efficient and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is an elevation of the apparatus embodying the features of my invention showing the same as applied.

Figure 2 is an elevation thereof showing the casing removed, and

Figure 3 is a vertical section through the casing and the portion of the trap passing therethrough.

Referring to the drawing in detail it will be seen that 1 designates an ordinary waste pipe passing through the usual wall flange 2. A fixture such as an ordinary wash basin is shown at 3 having the tail piece 4 depending therefrom. My automatic self sealing trap indicated generally at A is disposed between the fixture tail piece 4 and the end of the waste pipe 1 being held in place by lock nuts 5 and 6. The trap proper indicated at P is substantially J-shaped including the short arm 7 the end of which is connected to lock nut 6 and the long arm 8 the end of which is connected to lock nut 5. An opening 9 is provided in the longer leg 8 a distance below its upper ends. A casing 10 is disposed about the longer leg 8 and encloses the opening 9, said opening being situated adjacent the upper end of this casing. An inverted U-shaped pipe 12 is connected to the longer leg 8 as at 13 adjacent the bottom of the casing 10 and the other end thereof terminates within the casing. This pipe 12 acts as a siphon as will be explained hereinafter. The capacity of the casing 10 should be greater than that of the trap. It is customary that the trap P hold about one-quarter of a pint of water and the casing, therefore, should be constructed to hold about one-half of a pint of water.

As water flows from the fixture 3 through the tail piece 4 for the first time it will fill both the trap P and casing 10. The opening 9 allows the escape of air from the casing as it is filled by the water seeking its own level through the pipe or tube 12. The apparatus is now ready for continuous efficient operation. If the trap, as sometimes happens, should become empty because of an excessive suction through the sewerage system it will be seen that the water in the casing 10 will be siphoned through the pipe 12 into the trap in a sufficient quantity to seal the same.

While the preferred embodiment of my invention has been described in detail, it will be understood that I do not wish to be limited to the particular construction set forth, since various changes in the form, material, proportions, and arrangement of parts, and in the details of construction may be resorted to without departing from the spirit or scope of the invention as hereinafter claimed or sacrificing any of its advantages.

Having thus described my invention, what I claim as new is:

1. In combination, a water seal trap, a casing mounted about one member of the said trap, the trap having an opening therein adapted to communicate with the said casing, and a U-shaped tube connected to the trap having one end open within the casing, the said tube being adapted to act as a siphon to fill the trap.

2. A fixture of the class described comprising a U-shaped trap, a closed casing surrounding one leg of the trap, and an inverted U-shaped siphon tube completely housed within the casing and having the lower end of one of its legs in communication with the said leg of the trap and the corresponding end of its other leg in communication with the casing near the lower end of the casing, the said leg of the trap having an air vent opening therein near the upper end of the casing.

In testimony whereof I affix my signature.

SCOTT OPDYKE.